United States Patent
Hesselink et al.

[11] Patent Number: 5,995,251
[45] Date of Patent: Nov. 30, 1999

[54] APPARATUS FOR HOLOGRAPHIC DATA STORAGE

[75] Inventors: Lambertus Hesselink, Woodside; John F. Heanue, San Jose; Andrew J. Daiber, Palo Alto, all of Calif.

[73] Assignee: Siros Technologies, Inc., San Jose, Calif.

[21] Appl. No.: 09/116,752

[22] Filed: Jul. 16, 1998

[51] Int. Cl.⁶ .................................................. G03H 1/00
[52] U.S. Cl. ........................... 359/30; 359/22; 359/29; 365/125; 369/103
[58] Field of Search ................................. 359/21, 22, 24, 359/25, 29, 30, 35; 365/125, 216; 369/103

[56] References Cited

U.S. PATENT DOCUMENTS

| | | | |
|---|---|---|---|
| 5,128,693 | 7/1992 | Tatemichi et al. | 359/22 |
| 5,519,651 | 5/1996 | Redfield | 359/22 |
| 5,719,691 | 2/1998 | Curtis et al. | 359/22 |
| 5,838,469 | 11/1998 | Campbell et al. | 359/21 |

*Primary Examiner*—Cassandra Spyrou
*Assistant Examiner*—Darren E. Schuberg
*Attorney, Agent, or Firm*—Lumen Intellectual Property Services

[57] ABSTRACT

A holographic data storage apparatus having no readout lens. The apparatus has a spatial light modulator (SLM), a focusing element such as a lens, a holographic data storage material and a spatial light detector such as a CCD. The lens is located between the SLM and CCD such that the SLM is imaged onto the CCD (i.e. the positions of the SLM, lens, and CCD satisfy the lens equation). The holographic storage material is located between the lens and CCD. Preferably, the storage material is located centered upon a Fourier plane of the lens. In this case, the apparatus also has a phase mask located adjacent to the SLM. Alternatively, the storage material is located a distance away from the Fourier plane or is not centered on the Fourier plane. In yet another embodiment, the holographic storage material is located in contact with the CCD.

36 Claims, 8 Drawing Sheets

Light intensity in Fourier plane without a phase mask at SLM

Fig. 4A

Light intensity in Fourier plane
with a phase mask at SLM

Fig. 12B ated output of the SLM is directed towards a positive lens.
APPARATUS FOR HOLOGRAPHIC DATA STORAGE This invention was made with U.S. Government support under grant No. MDA972-94-2-0008, awarded by the ARPA-Industry-University Photorefractive Information Storage Materials (PRISM) Consortium. The U.S. Government has certain rights in this invention.

FIELD OF THE INVENTION

This invention relates generally to holographic storage and readout of optical data. More particularly, it relates to a simplified holographic data storage system which does not have a readout lens.

BACKGROUND OF THE INVENTION

Optical systems provide extremely fast and effective means for processing information. In a typical system, an image comprising data is modulated into a coherent light beam. This can be performed by a spatial light modulator placed in the beam. The resulting spatially modulated beam then enters a series of optical elements which filter and process the image, and a detector records the final output. The list of applications for these systems is long, including image and data processing, pattern recognition, optical computation, and high density data storage systems such as holographic data storage systems.

Prior art holographic data storage systems have primarily made use of Fourier hologram recordings. In such a system, a collimated laser beam is directed through a spatial light modulator (SLM) which impresses into the beam the desired optical data to be stored in the system. The spatially modulated output of the SLM is directed towards a positive lens. The SLM is located at a front focal plane of the lens, while a holographic storage material, commonly a photorefractive crystal or photosensitive material, is located at a back focal plane. It is well known that after passing through the lens and arriving at the crystal, the modulated beam generates the spatial Fourier transform of the original data (see, for example, J. W. Goodman, Introduction to Fourier Optics, McGraw-Hill, 1968). Hence, a volume hologram is formed in the crystal by the interference of the modulated beam with a reference laser beam directed into the crystal.

Once the hologram is created, the original signal can be retrieved by directing the reference beam into the crystal. However, the reconstructed beam initially contains the transformed data not the original data. To render the optical data in its original form produced by the SLM, the reconstructed beam must be focused by a lens, referred to hereafter as a readout lens. Generally, the readout lens focuses the beam on the surface of a spatial light detector, most commonly a charge coupled device (CCD). The resulting image is that of the original data and is consequently recovered by the detector.

A 4-focal length (4-f) Fourier holography arrangement has traditionally been used for holograhic data storage. In a 4-f system, a spatial light modulator is placed at the front focal plane of a first lens and the holographic storage medium is placed at the back focal plane (the Fourier plane) of the first lens. A second lens is placed after the medium at a distance from the first lens equal to the sum of the focal lengths of the first and second lens, and a detector array is placed at the back focal plane of the second lens. Each pixel imaged on the detector array is recorded throughout the medium. The device is therefore less susceptible to error than a device which records data only at an image plane. Also, the tolerances of lens placement and design are less strict. However, a 4-f system has the disadvantage of requiring a relatively large number of optical components, which increases the cost of such systems.

Prior art holographic data storage systems generally require a relatively large number of complex and costly optical components.

SUMMARY OF THE INVENTION

Briefly, and in general terms, the present invention provides a holographic storage and readout system that does not have a readout imaging element (e.g. a readout lens). The absence of a readout imaging element generally results in reduced complexity, to a compact readout subsystem and may result in lower cost and more reliable operation.

The holographic data storage system of the present invention includes an optical focusing element which has an associated object plane and an associated image plane. The focusing element is preferably a lens or lens assembly, but can also be a curved mirror. A spatial light modulator is located at the object plane and a spatial light detector is located at the image plane. A holographic storage material is located between the focusing element and the spatial light detector. There is no readout lens located between the holographic storage material and the spatial light detector.

In the presently preferred embodiment, by way of example and not necessarily by way of limitation, the storage material is located such that a Fourier plane of the focusing element is located within the storage material.

In a particularly preferred embodiment, the focusing element is located midway between the spatial light modulator and the spatial light detector, and the storage material is located midway between the focusing element and spatial light detector. The spatial light modulator and spatial light detector are each located 2 focal lengths from the focusing element, and the storage material is located one focal length away from each the lens and spatial light detector.

Also, the holographic data storage material can be removable from the data storage device.

During readout of data from the holographic storage material, a reference beam is directed into the storage material, thereby producing a converging beam. The converging beam is a replica of the beam which contains the original data. The converging beam is focused onto the spatial light detector, thereby retrieving data stored in the storage material.

The present invention includes an apparatus which performs only readout of data from the storage material. This apparatus has a spatial light detector, a means for directing the reference beam toward the storage material, and a means for holding the storage material. When the reference beam is directed toward the storage material, the converging beam is output from the storage material and is incident upon the detector, facilitating the readout of data. No readout imaging element is present between the storage material and the spatial light detector.

DETAILED DESCRIPTION

Figure 1:
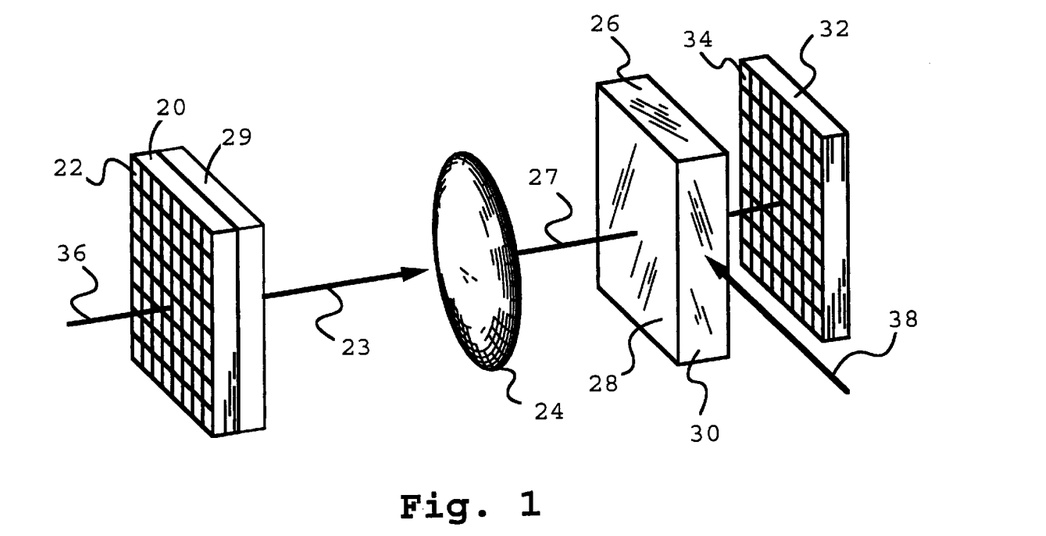
FIG. 1 is perspective view of a holographic storage system according to the preferred embodiment of the present invention.
Figure 2:
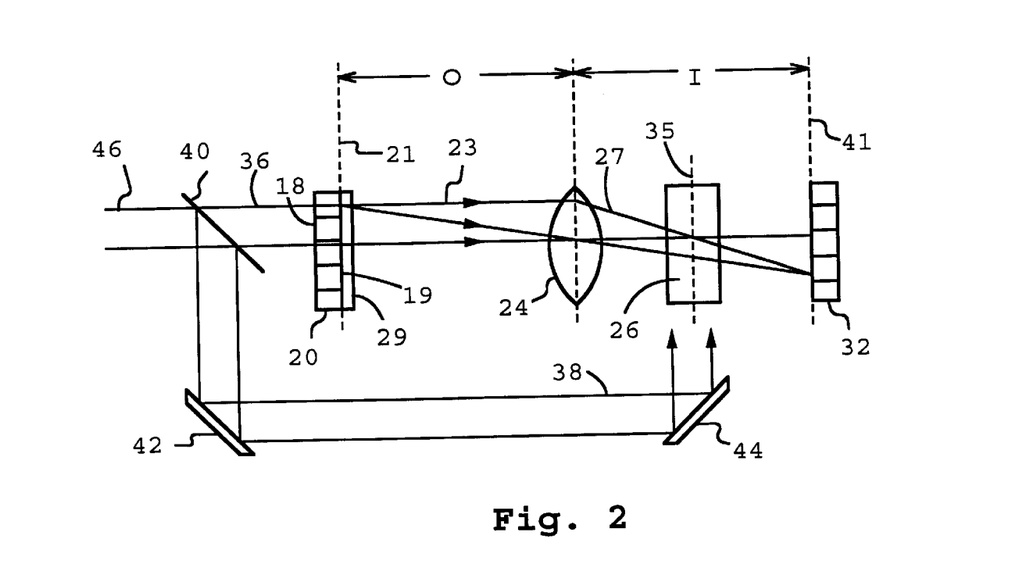
FIG. 2 is a side view of the preferred embodiment of the present invention in which a holographic storage material is located centered upon a Fourier plane.

A preferred embodiment of the present invention is shown in FIG. 1 and a more detailed schematic of its operation is depicted in FIG. 2. The apparatus of the present invention comprises a spatial light modulator (SLM) 20, an optical focusing element 24, a holographic storage material 26, and a spatial light detector 32 comprising an array of individual light detectors 34. The SLM 20 comprises an array of light modulating elements 22. The holographic storage material 26 is located between the lens 24 and the light detector 32. In the preferred embodiment, the optical focusing element 24 is a simple converging lens. In an alternative embodiment, a curved mirror is used. The storage material 26 is preferably a photopolymer and is referred to below as simply the storage material 26. The light detector 32 is preferably a charge coupled device, or CCD.

The SLM 20 is located at an object plane 21 associated with the lens 24. The COD 32 is located at an image plane 41 associated with the lens 24. An object distance O to the object plane and an image distance I to the image plane satisfy the lens equation $O^{-1}+I^{-1}=F^{-1}$, where F is the focal length of lens 24. The SLM 20 is coincident with the object plane 21 and the CCD 32 is coincident with the image plane 41. If the storage material 26 is thick and has a large refractive index, then the distances I and O generally will not exactly satisfy the lens equation. A skilled artisan will be able to compensate for this thickness and properly located the SLM and CCD. The SLM and CCD should be located so that the SLM is imaged onto the CCD by the lens 24.

A particularly convenient and preferable geometrical design choice, although not necessary, is the design which results in unit (1:1) magnification between the object plane and image plane. If the storage material 26 is thin, then the 1:1 magnification design is given by O=I=2F. Unit magnification is preferred in the present invention because it results in reduced aberrations and distortions which could otherwise result in errors when reading out data stored in the storage material 26.

In an alternative embodiment, the magnification is not 1:1. This allows the spatial light modulator and CCD to be different sizes or to have different pixel sizes.

In the preferred embodiment, the apparatus has a phase mask 29 adjacent to the SLM 20. The phase mask 29 can be a random phase mask or a quasi-random phase mask. The phase mask imparts to a spatially modulated beam 23 a different phase at each pixel 22 location of the SLM 20. The phase mask 29 is preferably bonded to the SLM 20, either on the input side 18 or output side 19 of the SLM 20 as shown. The phase mask 29 should be located within the Raleigh range of the SLM 20. The Raleigh range is equal to $P/\lambda$, where P is the lateral size of the SLM pixels and $\lambda$ is the wavelength of light. A skilled artisan will be able to locate the phase mask 29.

In operation, an incident, coherent light beam 46 is split by a beam splitter 40 into a signal or an object beam 36 and a reference beam 38. The output of elements 22 at the object plane 21 comprises the optical data whose storage and subsequent retrieval is of interest. The spatially modulated object beam 23 leaves the SLM 20 and phase mask 29 and enters lens 24. The output of the lens 24, denoted a focused beam 27, converges such that an image of the data encoded in beam 23 by the SLM 20 is formed at the image plane 41.

During storage of data, reference beam 38 is guided by mirrors 42 and 43 and directed through a side 30 of storage material 26. Focused beam 27 enters storage material 26 through a front face 28 of storage material 26 and intersects reference beam 38, forming a hologram within storage material 26. The hologram contains the data present at the SLM at the time of recording. For most choices of the storage material, it is preferable for the reference beam 38 and focused beam 27 to have the same direction of polarization.

Figure 3:
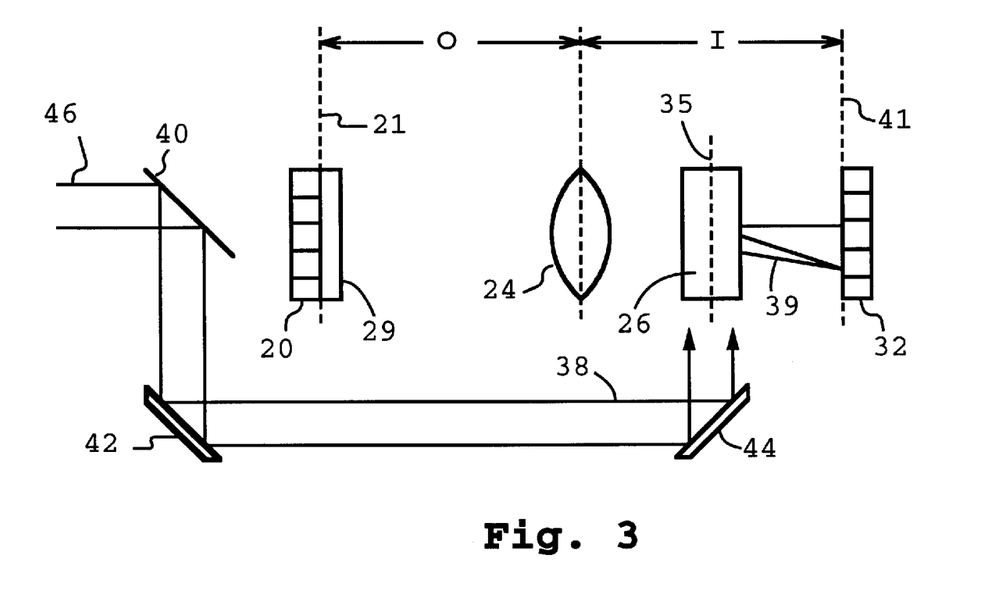
FIG. 3 is a side view illustrating a data readout process used with the apparatus of the present invention.

FIG. 3 depicts the data readout process used with the present invention. The object beam 36 is prevented from entering the SLM 20, and the reference beam 38 is directed into the storage material 26. The hologram in the storage material 26 causes the focused beam 27 to be recreated when only the reference beam 38 is directed into the storage material 26. The illuminated hologram emits a converging beam 39 which converges to form an image of the data on CCD 32. The converging beam 39 is a holographically reproduced copy of the focused light beam 27. No readout lens between the storage material 26 and CCD 32 is needed for imaging the converging beam 39. The converging beam contains the same information present in the focused beam 27, thereby recovering data holographically stored in the storage material 26. It is emphasized that readout of data stored in the storage material 26 requires only the reference beam 38, CCD 32, and a means for holding the storage material 26 with no readout imaging element (e.g., a readout lens) being necessary. The lens 24 has an associated Fourier plane 35 located between the lens and image plane 41. For maximum data density in the storage material (data bits per unit volume), the storage material 26 should be located centered upon the Fourier plane 35, as shown in FIG. 2. However, the storage material 26 can only be located to encompass (or near) the Fourier plane if the phase mask 29 is used. If a phase mask is not used, then the light intensity at the Fourier plane will vary over many orders of magnitude and this can cause problems, as explained below.

Figure 4A:
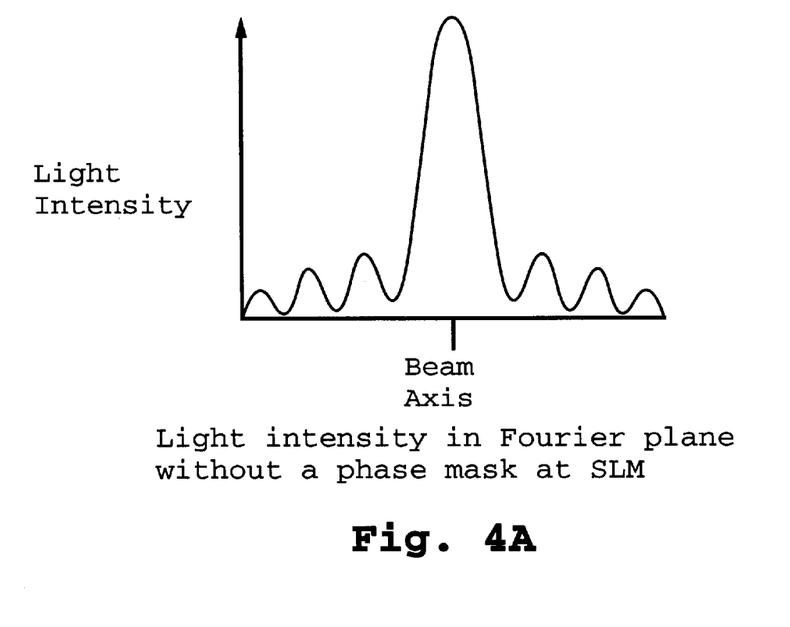
FIG. 4A is a graph of the light intensity distribution in the Fourier plane when a phase mask is not included in the apparatus of the present invention.
Figure 4B:
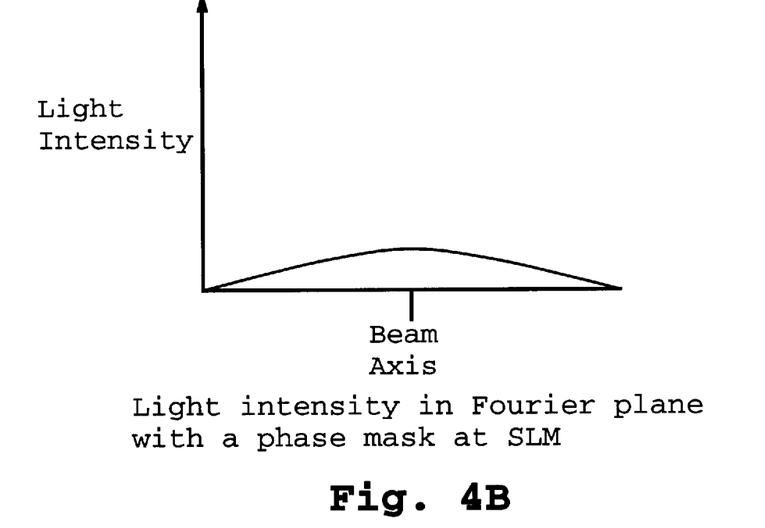
FIG. 4B is a graph of the light intensity distribution in the Fourier plane when the phase mask is included.

FIG. 4A and FIG. 4B illustrate the effect that the phase mask 29 has upon the light intensity distribution in the Fourier plane 35. FIG. 4A shows the light intensity at the Fourier plane in the case where no phase mask is used at the SLM. Much of the light incident upon the lens 24 has a spatial frequency of essentially zero and therefore converges at the center of the Fourier plane, i.e. at the beam axis. The beam axis location therefore has a very high light intensity and locations far from the beam axis have a very low light intensity. This high dynamic range in light intensity can result in damage to the storage material in regions exposed to a high light intensity, and poor data retention (i.e. poor hologram formation) in regions exposed to a low light intensity. Further, the high dynamic range results in inefficient hologram generation. FIG. 4B shows the distribution in light intensity at the Fourier plane 35 when a phase mask 29 is used. The light intensity is more uniform (i.e. has lower dynamic range) over the Fourier plane 35. Therefore, the light intensity is more uniform throughout the volume of the storage material 26. The phase mask should be selected to reduce the dynamic range in light intensity so that high quality holograms are recorded in the storage material 26.

It is noted that, if the coherent light beam 46 is collimated when it passes through the SLM, then the Fourier plane 35 is located at the focal plane of the lens 24 (i.e. one focal length away from lens). If the light beam 46 is diverging or converging when it passes through the SLM, then the Fourier plane 35 will not be located at the focal plane of the lens. The above described issues of light intensity dynamic range are most important for regions near the Fourier plane 35, wherever it may be located.

Figure 5:
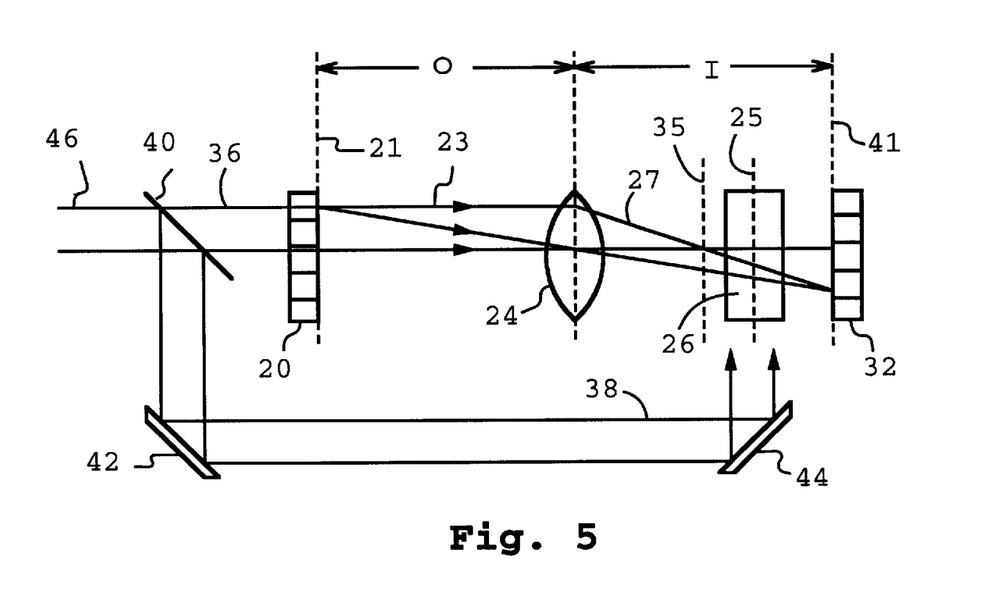
FIG. 5 is a side view of an alternative embodiment of the present invention in which the holographic storage material is located away from the Fourier plane.

FIG. 5 shows an alternative embodiment of the present invention. Here, the apparatus does not have a phase mask 29 and the storage material is located away from the Fourier plane 35. The storage material is located symmetrically about a near-Fourier, or Fresnel plane 25. The dynamic range of the light intensity is much lower at the Fresnel plane 25 than at the Fourier plane 35. This fact obviates the phase mask 29 if the storage material 26 is located far enough from the Fourier plane 35. How far is far enough depends upon the holographic recording characteristics of the storage material 26, and therefore the material composition of the storage material 26. Use of a phase mask 29 in combination with the storage material 26 at a Fresnel plane may further improve the performance of the apparatus.

It is noted that the maximum data density which can be stored in the storage material 26 will be lower if the storage material is located at a Fresnel plane 25 rather than at the Fourier plane 35. This is because the focus spot size for a single spatial frequency increases with distance from the Fourier plane 35. It is also noted that, if the storage material 26 is to be located away from the Fourier plane 35, it is best to locate the storage material between the Fourier plane and the CCD 32 instead of between the Fourier plane and the lens 24.

Figure 6:
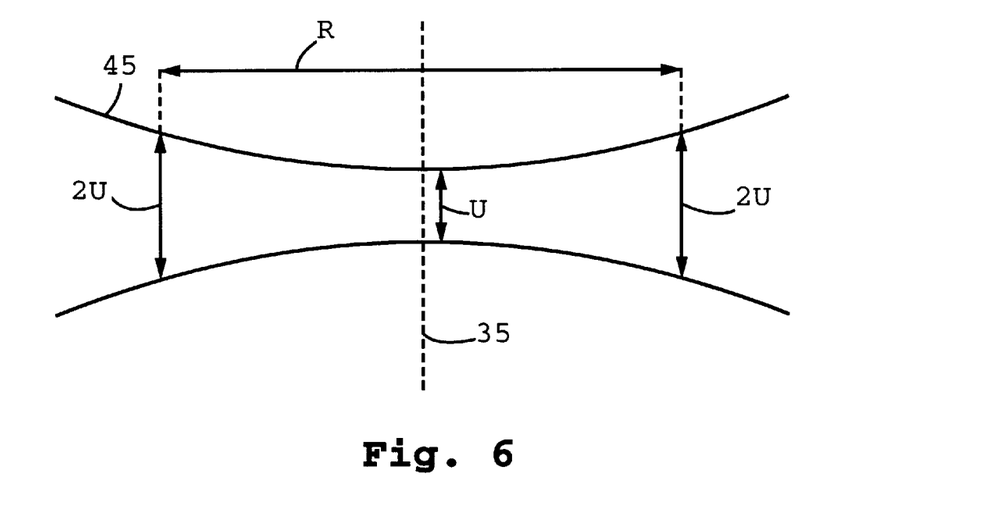
FIG. 6 is a closeup view of a focused beam in the vicinity of the Fourier plane.

In the case where the storage material is located at or near the Fresnel plane 25, it is best for the storage material to be located within a certain distance of the Fourier plane so that a relatively high data density capability is maintained. FIG. 6 shows a closeup side view of the focused beam in the vicinity of the Fourier plane 35. At the Fourier plane 35, the light beam has a minimum waist diameter of U. It is preferred for the storage material 26 to be located entirely within a range labeled R, which is the range in which the beam diameter is less than 2U. U can be calculated from the following equation:

$$U = \frac{F\lambda}{P},$$

where F is the focal length of the lens 24, $\lambda$ is the wavelength of the light used, and P is the width of a single pixel 22 of the SLM 20. R can be directly calculated from the following equation:

$$R = \frac{4FU}{P} = \frac{4F^2\lambda}{P^2}.$$

R is centered upon the Fourier plane 35.

Figure 7:
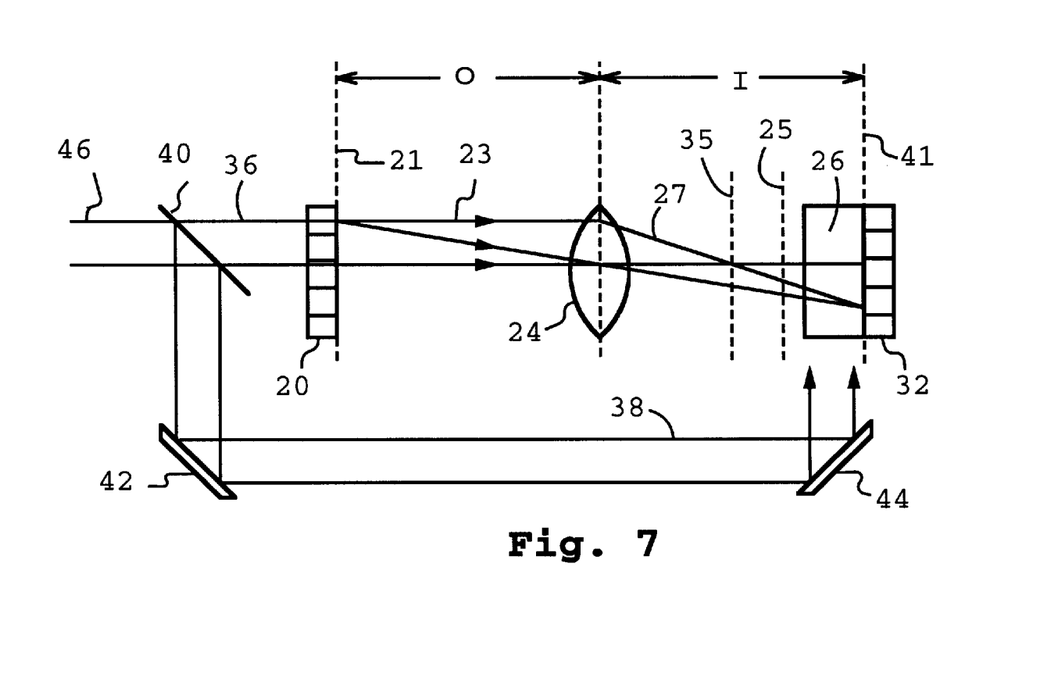
FIG. 7 is a side view of an alternative embodiment of the present invention in which the holographic storage material is substantially in contact with a spatial light detector (CCD).

FIG. 7 shows yet another embodiment of the present invention in which the storage material 26 is in contact with the CCD 32. Although this embodiment does not offer the high data densities achieved by locating the storage material 26 at the Fourier plane 35, it is especially compact and simple to manufacture. Preferably, the storage material and CCD are permanently bonded together in this embodiment, with an index matching medium between the CCD and storage material to minimize reflections. This embodiment simplifies manufacturing of the apparatus because the storage material 26 and CCD 32 are both aligned in a single step. The CCD acts as a mechanical fiduciary in maintaining the alignment of the storage material 26.

The present invention encompasses many different structural variations. The storage material 26 can be located anywhere between the lens 24 and the CCD 32. The performance of the apparatus will depend upon the location of the storage material 26 with respect to the Fourier plane 35 and image plane 41.

It is noted that the lens 24 of the present invention must be very accurately manufactured. The lens must image the SLM 20 onto the CCD 32 with a minimum of distortion or aberration. The requirements on the lens are more stringent if the SLM and CCD pixels are very small. Generally, the lens 24 should have a large space-bandwidth product.

Figure 8A:
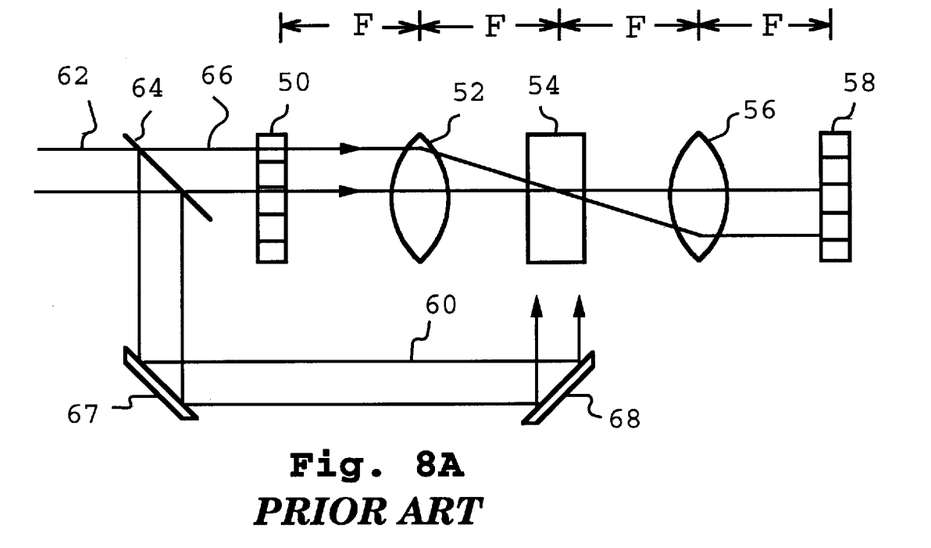
FIG. 8A is a side view of a prior art holographic data storage apparatus.

FIG. 8A depicts a prior art system for holographic data storage. The system has a readout lens 56 not used in the apparatus of the present invention. The other components are a SLM 50, a lens 52, a CCD 58, and beamsplitter 64. Each lens 52, 56 has focal length F. An incident laser beam 62 is split by the beam splitter 64 into an object beam 66 and a reference beam 60 which are guided by mirrors 67 and 68. The SLM 50, storage material 54, and CCD 58 are placed at the focal points of the two lenses 52 and 56 in the manner shown. This results in a hologram being recorded in the storage material 54.

Figure 8B:
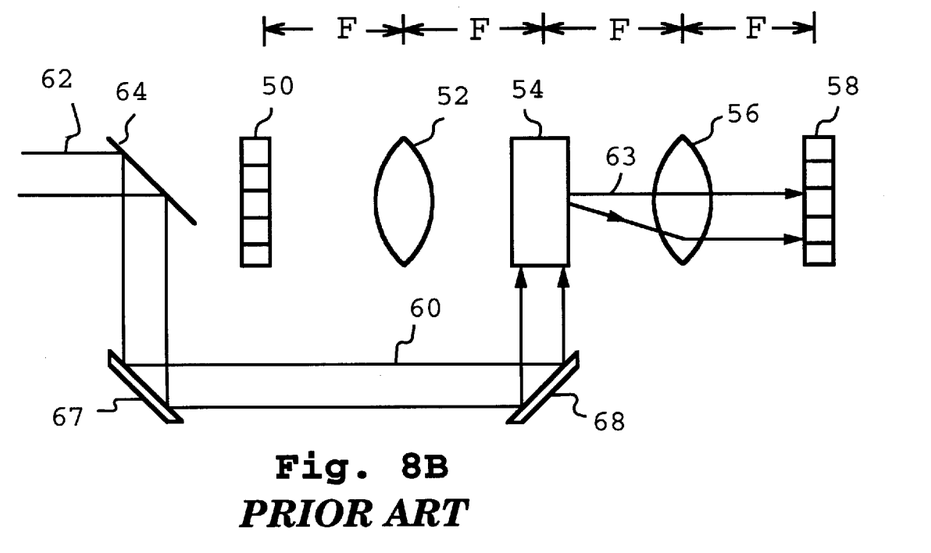
FIG. 8B shows the readout process used with the apparatus of FIG. 8A.

FIG. 8B shows a readout step as performed with the prior art system of FIG. 8A. The reference beam 60 is directed into the storage material 54. Unlike the present invention, a reconstructed beam 63 is nonconverging. In fact, application of the lens equation indicates that an image produced by beam 63 is located at infinity. Therefore it is necessary to use readout lens 56 to transform the reconstructed beam 63 into a focused image at CCD 58. The CCD must be located a finite distance from the storage material 54. Also, the readout lens 56 must be located a focal length from the CCD 58.

Clearly, the preferred embodiment of the present invention depicted in FIGS. 1 and 2 offers several advantages over the prior art apparatus of FIGS. 8A and 8B. The present invention has one less lens, providing a less complicated, lighter, and less expensive system. Fewer components are easier to align and therefore result in a more robust apparatus. Fewer elements perform less internal processing and hence offer less opportunity for aberrations or other errors to enter. Additionally, the readout operation is substantially simplified. This is especially advantageous in read-only memory or ROM systems where the readout subsystem of the invention is implemented separately, leading to very compact and simple readout devices. Also, in the embodiment where the storage material and CCD are in contact, alignment between the storage material and CCD is always maintained.

There are several modifications and variations which lie within the scope of the present invention. For example, the invention could be implemented with one of many types of spatial light modulators, spatial detector types, and storage materials. Examples of SLM devices include twisted-nematic liquid storage material arrays, ferroelectric liquid storage material arrays, and micromirror arrays. Examples of spatial light detectors include CMOS detectors, and photodiode arrays, among others.

Figure 9A:
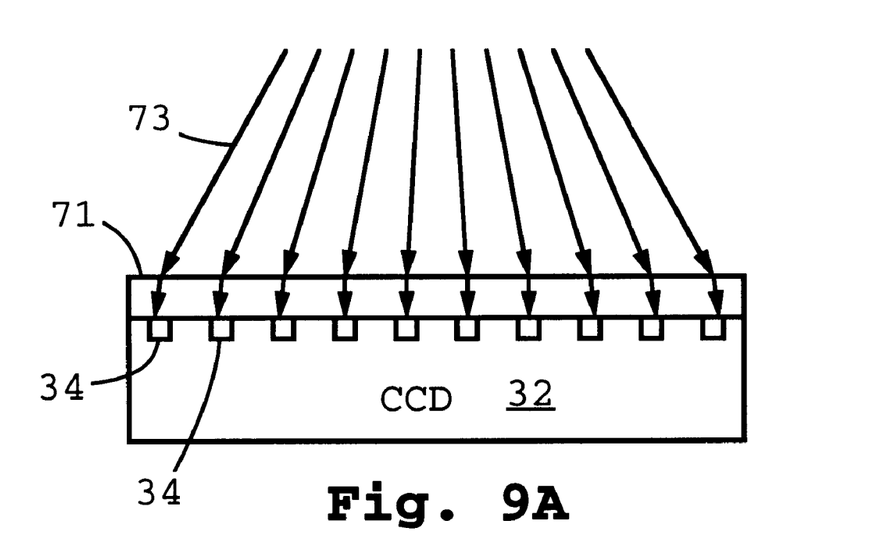
FIGS. 9A, 9B, and 9C show various optical components which can be used with the spatial light detector.
Figure 9B:
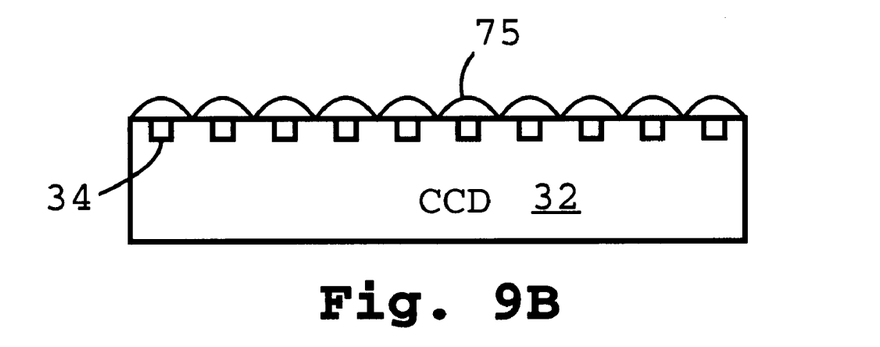
Figure 9C:
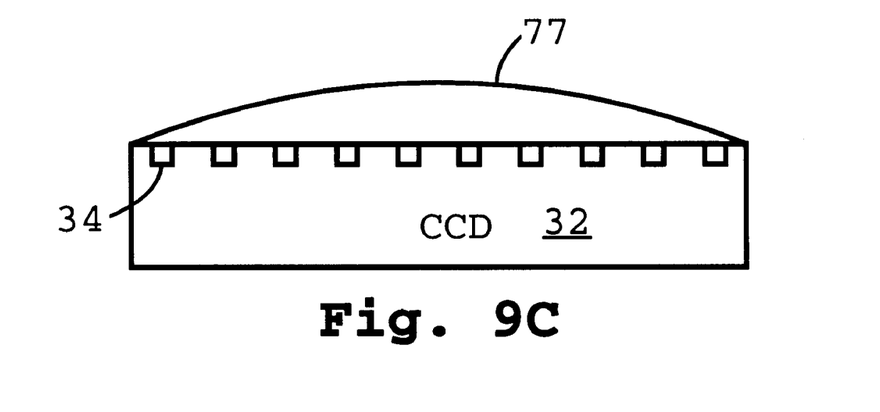

It is noted that the holographic storage material 26 can be any type of photosensitive material capable of storing a hologram. Examples of such materials include $LiNbO_3$, photopolymers, and photosensitive glasses FIGS. 9A, 9B, and 9C show closeup views of the CCD 32 with various optical components on the front surface of the CCD as can be used in the present invention. FIG. 9A shows the CCD 32 with a flat slab 71 of transparent material such as glass on the CCD. The slab 71 protects the CCD. Further, the slab 71 refracts incoming light 73, causing the light to strike the CCD pixels at an angle closer to perpendicular. This increases the detection efficiency of the CCD 32. FIG. 9B shows a CCD 32 with lenslets 75 arranged on the surface of the CCD. The lenslets 75 help to funnel light into the CCD pixels 34, increasing the detection efficiency of the CCD. FIG. 9C shows the CCD 32 with a field lens 77 attached to the front surface of the CCD 32. The field lens 77 refracts incoming light causing the light to strike the CCD pixels 34 at an angle closer to perpendicular, having an effect similar to the flat slab of FIG. 9A. The field lens 77 is non-imaging, unlike the readout lens 56 in FIGS. 8A and 8B. Preferably, the field lens 77, lenslets 75, and flat slab 71, if used, are in contact with the CCD 32. Alternatively, they can be spaced a small distance away from the CCD. Also alternatively, flat slab 71, lenslets 75, or field lens 77 are used with the SLM 20. The use and design of field lenses 77 is well known in the art.

The focusing element 24 can be a compound lens comprised of a plurality of lenses cemented together, or it could be a mirror, or a mirror and a lens or any combination thereof. The transmission angles and geometries can also vary substantially as can the number and types of mirrors used to align the laser beams. All that is required is for the focusing element to have an associated object plane and image plane.

Also, any number of multiplexing techniques can be implemented to store many different Fresnel holograms, or pages, within the recording material, and read out in a lensless manner. This might involve storing many pages in a single storage material slab or volume, or a material comprising an array of many storage materials, storing one page per array element.

Applicable multiplexing techniques for storing many pages of data include angular multiplexing and wavelength multiplexing.

In another variation the readout is performed in a device separate from the storage system. Data is stored holographically in a storage material by means described above. Then the storage material is transferred to a separate readout device. The data is recovered from the storage material as described above: a reference beam is directed into the material and the resulting emerging beam converges to a focused image of the data; a spatial light detector is set at the location of the image and detects the data.

Figure 10:
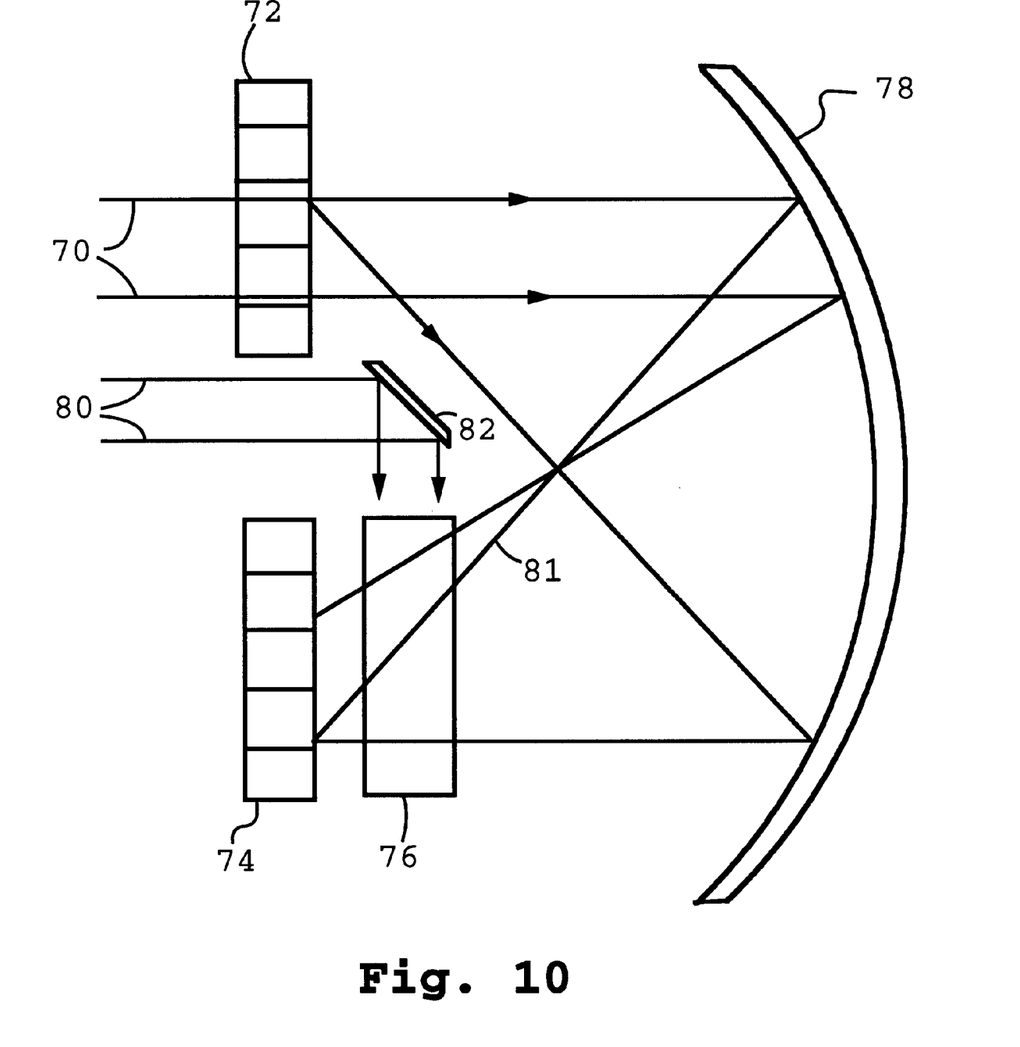
FIG. 10 is a side view of an alternative embodiment of the present invention in which a mirror is used as the focusing element.

Another variation involves using a curved mirror instead of a lens for the optical focusing element. The geometry of this embodiment is shown in FIG. 10. An object beam 70 enters and exits a SLM 72 and is focused by a spherical or curved mirror 78. Mirror 78 focuses the image of the data at the location of CCD 74. Storage material 76 is located in an optical path 81 between the mirror 78 and CCD 74. As in the preferred embodiment, if the object distance from SLM 72 to mirror 78 and the image distance from mirror 78 to CCD 74 are each equal to twice the focal length of mirror 78, then mirror 78 approximates ideal mirror behavior and a resulting SLM image is in focus on the CCD 74 with unit magnification.

It is noted that the mirror 78 has a Fourier plane and Fresnel planes analogous to the Fourier and Fresnel planes shown in FIG. 2. In the case of FIG. 10 where mirror 78 is used as the focusing element, the same concerns of where to position the storage material 76 apply as in the case of using a lens as the focusing element. More specifically, it is best to locate the storage material 76 centered upon the Fourier plane. Also, if the storage material 76 is located close to or encompasses the Fourier plane, then a phase mask should be included in close proximity (i.e. within a Raleigh range) to the SLM 72 so that the dynamic range of the light intensity at the Fourier plane is reduced. Also, the storage material can be located substantially in contact with the CCD. Most generally, the storage material 76 can be located anywhere in an optical path between the mirror 78 and CCD 74.

In operation, the storage material 76 records a hologram of the data with the use of a reference beam 80. Readout is accomplished as described above by applying reference beam 80 to storage material 76 and detecting the resulting focused image by CCD 74. This embodiment is particularly compact as the processing components are no longer arranged in a linear fashion. Furthermore, since object beam 70 and reference beam 80 initially are parallel and close as they enter the system they could be provided by a single expanded laser beam. The expanded beam would overlap SLM 72 and mirror 82, simultaneously providing object beam 70 for SLM 72 and reference beam 80 for storage material 76.

Figure 11:
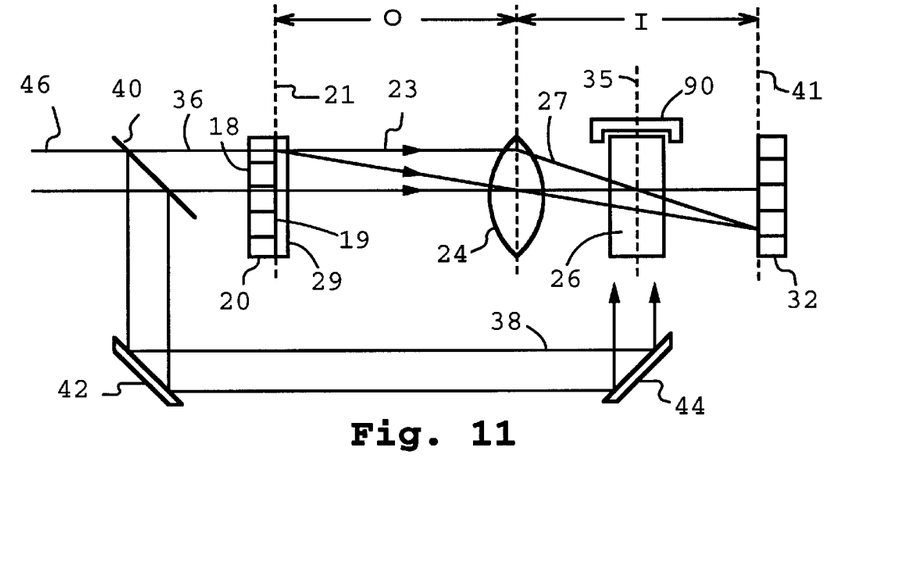
FIG. 11 is a side view of an alternative embodiment of the present invention in which a holder is provided for removably holding the holographic storage material.

It is noted that the present invention can be used to provide a means of transportably storing data by making the holographic storage material (storage material 26), removable from the apparatus. The storage material 26 could then be transported and inserted into the apparatus to output data which is holographically stored. FIG. 11 shows an embodiment of the present invention which has a holder 90 for holding the storage material in position between the lens 24 and CCD 32. The holder 90 allows the storage material to be removed from the device. In this way, the storage material 26 can be used to transport data. The holder 90 must hold the storage material 26 in fixed, accurate alignment with respect to the CCD, lens and SLM. The holder 90 can be a clamp, screw, or the like.

Figure 12A:
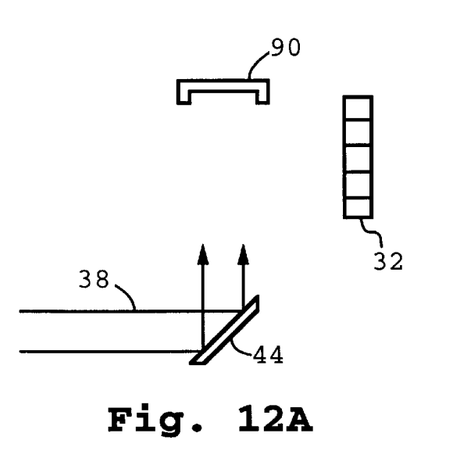
FIGS. 12A and 12B show a readout only holographic data device according to the present invention.
Figure 12B:
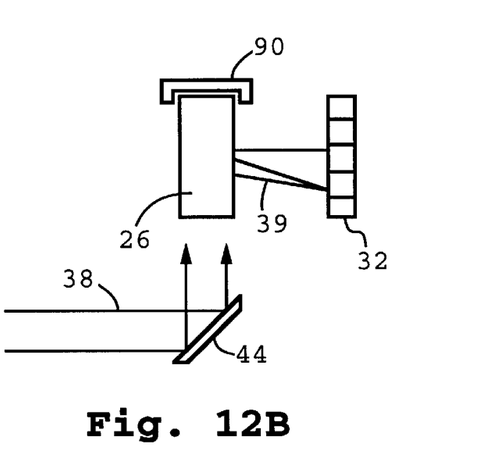

FIG. 12A shows an embodiment of the present invention capable of providing only readout of data stored in the storage material 26. The readout-only apparatus has the holder 90 for holding the storage material, the CCD 32, and a means for directing the reference beam 38 toward the storage material when it is held in the holder. FIG. 12B shows the embodiment of FIG. 12A with the storage material 26 in the holder 90. When the reference beam 38 is directed toward the storage material 26, the converging light beam 39 is created and incident upon the CCD 32, thereby reading out the data stored in the storage material 26. The apparatus of FIG. 12A is not capable of storing data in the storage material.

It can now be understood why it may be desirable to locate the storage material 26 close to the CCD 32 (i.e. between the Fourier plane 35 and the CCD) as in the embodiment of FIG. 5. When the storage material 26 is located close to the CCD 32, the corresponding readout-only apparatus (the apparatus of FIGS. 12A and 12B) is more compact. This is because the readout-only apparatus requires less space between the storage material 26 and the CCD 32.

The present invention provides a holographic storage and readout system which does not have a readout imaging element. There is no imaging element between the storage material 26 and the CCD 32. Although there may be a field lens 77, or lenslets between the storage material 26 and CCD 32, they are non-imaging.

It is noted that the removability of the holographic storage material is aided by the fact that no readout imaging element is used. The absence of a readout lens simplifies the task of aligning the storage material with respect to the other optical elements.

It will be clear to one skilled in the art that the above embodiments and variations may be altered and combined in many ways without departing from the scope of the invention. Accordingly, the scope of the invention should be determined by the following claims and their legal equivalents.

What is claimed is:

1. An apparatus for holographic data storage, the apparatus comprising:
    a) an optical focusing element having an associated object plane and an associated image plane;
    b) a spatial light modulator located at the object plane of the optical focusing element;
    c) a spatial light detector located at the image plane of the optical focusing element;
    d) an optical path extending from the focusing element to the spatial light detector;
    e) a holographic storage material located in the optical path.

2. The apparatus of claim 1 wherein the holographic storage material is located such that it encompasses a Fourier plane associated with the focusing element.

3. The apparatus of claim 2 wherein the holographic storage material is centered upon the Fourier plane.

4. The apparatus of claim 1 wherein the holographic storage material is located within a range R in the optical path.

5. The apparatus of claim 1 wherein the holographic storage material is substantially in contact with the spatial light detector.

6. The apparatus of claim 1 wherein the focusing element has a focal length F and the spatial light modulator is located a distance of 2F from the focusing element and the spatial light detector is located a distance of 2F from the focusing element.

7. The apparatus of claim 1 wherein the focusing element provides 1:1 magnification between the image plane and the object plane.

8. The apparatus of claim 1 further comprising a phase mask located in proximity to the spatial light modulator.

9. The apparatus of claim 8 wherein the phase mask is a random phase mask.

10. The apparatus of claim 8 wherein a distance between the spatial light modulator and the phase mask is less than a Raleigh range of the spatial light modulator.

11. The apparatus of claim 1 without a readout imaging element between the holographic storage material and the spatial light detector.

12. The apparatus of claim 1 wherein the optical focusing element comprises a lens.

13. The apparatus of claim 1 wherein the optical focusing element comprises a curved mirror.

14. The apparatus of claim 1 wherein the spatial light modulator is selected from the group consisting of twisted-nematic liquid storage material arrays, ferroelectric liquid storage material arrays, and micromirror arrays.

15. The apparatus of claim 1 wherein the holographic storage material is selected from the group consisting of photosensitive media, photorefractive media, photopolymers, photochromic materials, and photosensitive glasses.

16. The apparatus of claim 1 wherein the holographic storage material is removable from the apparatus.

17. An apparatus for providing data readout from and data input to a holographic storage material, the apparatus comprising:
    a) an optical focusing element having an associated object plane and an associated image plane;
    b) a spatial light modulator located at the object plane of the focusing element;
    c) a spatial light detector located at the image plane of the focusing element;
    d) an optical path extending from the focusing element to the spatial light detector;
    d) a holding means for holding the holographic data storage material in the optical path.

18. The apparatus of claim 17 wherein the holding means is positioned to hold the holographic storage material such that the storage material encompasses a Fourier plane associated with the focusing element.

19. The apparatus of claim 18 wherein the holding means is positioned to hold the holographic data storage material such that the storage material is centered upon a Fourier plane associated with the focusing element.

20. The apparatus of claim 17 wherein the holding means is positioned to hold the holographic data storage material within a range R in the optical path.

21. The apparatus of claim 17 wherein the holding means is positioned to hold the holographic storage material substantially in contact with the spatial light detector.

22. The apparatus of claim 17 wherein the focusing element has a focal length F and the spatial light modulator is located a distance of 2F from the focusing element and the spatial light detector is located a distance of 2F from the focusing element.

23. The apparatus of claim 17 wherein the focusing element provides 1:1 magnification between the image plane and the object plane.

24. The apparatus of claim 17 further comprising a phase mask located in proximity to the spatial light modulator.

25. The apparatus of claim 24 wherein the phase mask is a random phase mask.

26. The apparatus of claim 24 wherein a distance between the spatial light modulator and the phase mask is less than a Raleigh range of the spatial light modulator.

27. The apparatus of claim 17 without a readout imaging element between the holographic storage material and the spatial light detector.

28. The apparatus of claim 17 wherein the optical focusing element comprises a lens.

29. The apparatus of claim 17 wherein the optical focusing element comprises a curved mirror.

30. The apparatus of claim 17 wherein the spatial light modulator is selected from the group consisting of twisted-nematic liquid storage material arrays, ferroelectric liquid storage material arrays, and micromirror arrays.

31. The apparatus of claim 17 wherein the holographic storage material is removable from the apparatus.

32. The apparatus of claim 17 wherein the holographic storage material is removable from the holding means.

33. An apparatus for providing readout of data from a holographic storage material containing a hologram, the apparatus comprising:
  a) a spatial light detector;
  b) a holding means for holding the storage material;
  c) a light path extending from the storage material to the spatial light detector when the holographic storage material is held in the holder;
  c) a means for directing a reference beam into the storage material such that the hologram causes a converging beam to exit from the storage material and travel along the light path to the detector when the reference beam is input into the storage material;
  the apparatus not having an imaging element in the light path.

34. The apparatus of claim 33 wherein the imaging element is a readout lens.

35. The apparatus of claim 33 wherein the holographic storage material is substantially in contact with the spatial light detector.

36. The apparatus of claim 33 wherein the holographic storage material is removable from the holding means.

* * * * *